United States Patent
Owen et al.

(10) Patent No.: US 8,014,013 B2
(45) Date of Patent: Sep. 6, 2011

(54) SYSTEMS AND METHODS FOR SEGMENTING PAGES AND CHANGING SETTINGS FOR GRAPHICAL ELEMENTS IN PRINTING

(75) Inventors: James E. Owen, Vancouver, WA (US); Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1433 days.

(21) Appl. No.: 10/876,837

(22) Filed: Jun. 24, 2004

(65) Prior Publication Data

US 2005/0286063 A1    Dec. 29, 2005

(51) Int. Cl.
G06F 3/12 (2006.01)
G06F 17/28 (2006.01)
G06K 15/00 (2006.01)

(52) U.S. Cl. .................. 358/1.15; 358/1.18; 715/274
(58) Field of Classification Search .................. 715/274
See application file for complete search history.

(56) References Cited

U.S. PATENT DOCUMENTS

| | | | |
|---|---|---|---|
| 5,579,446 A | 11/1996 | Naik et al. | |
| 5,704,021 A | 12/1997 | Smith et al. | |
| 5,731,823 A | 3/1998 | Miller et al. | |
| 6,040,927 A | 3/2000 | Winter et al. | |
| 6,257,693 B1 | 7/2001 | Miller et al. | |
| 6,275,304 B1 | 8/2001 | Eschbach et al. | |
| 6,377,704 B1 | 4/2002 | Cooperman | |
| 6,621,590 B1 * | 9/2003 | Livingston | 358/1.15 |
| 6,832,139 B2 * | 12/2004 | Johnson et al. | 701/23 |
| 2001/0044797 A1 | 11/2001 | Anwar | |
| 2001/0044868 A1 | 11/2001 | Roztocil et al. | |
| 2002/0131070 A1 | 9/2002 | Housel et al. | |
| 2002/0131086 A1 * | 9/2002 | Mori et al. | 358/1.18 |
| 2003/0043414 A1 | 3/2003 | Brady | |
| 2004/0090644 A1 | 5/2004 | Nishikawa | |
| 2004/0120009 A1 * | 6/2004 | White et al. | 358/1.18 |
| 2004/0205640 A1 * | 10/2004 | Laughlin | 715/527 |
| 2005/0286063 A1 * | 12/2005 | Owen et al. | 358/1.13 |
| 2008/0043256 A1 * | 2/2008 | Broda et al. | 358/1.3 |

FOREIGN PATENT DOCUMENTS

| | | |
|---|---|---|
| EP | 1 014 694 | 6/2000 |
| EP | 1 176 549 | 1/2002 |
| GB | 2 282 110 | 3/1995 |

(Continued)

OTHER PUBLICATIONS

CorelDraw User Manual—Version 8 Corel Corporation 1997 (c) pp. 98, 317-318 & 685.*
CorelDraw User Manual—Version 8 Corel Corporation 1997 (c) pp. 97-98, 266-267, 283, 317-318, 685, 708-710, 712-713 & 715-716.*

(Continued)

*Primary Examiner* — Twyler L Haskins
*Assistant Examiner* — Barbara D Reinier
(74) *Attorney, Agent, or Firm* — Austin Rapp & Hardman

(57) ABSTRACT

A method for modifying settings in printing a document is disclosed. Document data is provided that comprises multiple graphical elements. The document data is converted into printing instructions. At least one setting is applied to the printing instructions. A preview is presented of the printing instructions to a user through a graphical display. The method enables the user to select a specific graphical element from the preview and to change the setting to a new setting. A device specific rendering is simulated using the new setting. The user is provided with the option of saving the new setting.

40 Claims, 11 Drawing Sheets

FOREIGN PATENT DOCUMENTS

| | | |
|---|---|---|
| GB | 2 359 646 | 9/1999 |
| JP | 2004-164106 | 6/2004 |

OTHER PUBLICATIONS

Windows NT Workstation Resource Kit: Introduction Microsoft p. 1.*

Microsoft Windows NT Workstation 4.0 Resource guide Microsoft (c) 1995 Microsoft Corporation.*

Windows NT Workstation Resource Kit: Printing Microsoft Chapter 7—Printing pp. 4 and 15.*

"hp color LaserJet 4600 series printer User Guide", Apr. 2002, 244 pp.

"Sharp Desk 3.0", Dec. 10, 2004, 2 pp., http://www.sharpusa.com/products/docsolutions/sharp_desk/0,2371,,00.html.

"AP3800CMF", Dec. 10, 2004, 6 pp. http://www.ricoh-usa.com/products/brochures/AP3800CMF.pdf.

* cited by examiner

SYSTEMS AND METHODS FOR SEGMENTING PAGES AND CHANGING SETTINGS FOR GRAPHICAL ELEMENTS IN PRINTING

TECHNICAL FIELD

The present invention relates generally to printing use of a computer. More specifically, the present invention relates to systems and methods for segmenting pages and for changing settings for graphical elements in printing.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Printers are a type of imaging device. Imaging devices include, but are not limited to, physical printers, multi-functional peripherals, a printer pool, a printer cluster, a fax machine, a plotter, a scanner, a logical device, an electronic whiteboard, a tablet PC, a computer monitor, a file, etc.

Different kinds of computer software facilitate the use of imaging devices. The computer or computing device that will be used to print the materials typically has one or more pieces of software running on the computer that enable it to send the necessary information to the printer to enable printing of the materials. If the computer or computing device is on a computer network there may be one or more pieces of software running on one or more computers on the computer network that facilitate printing.

When a document is desired to be printed, the document is typically converted into a different format before it is sent to the printer. In some systems settings are applied to the document as a whole before it is printed. Depending on the type of document being printed, there may be parts of the document that a user may wish to alter in some way. Benefits may be realized by providing systems and methods that enable a user to preview and change the settings in a selective manner.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
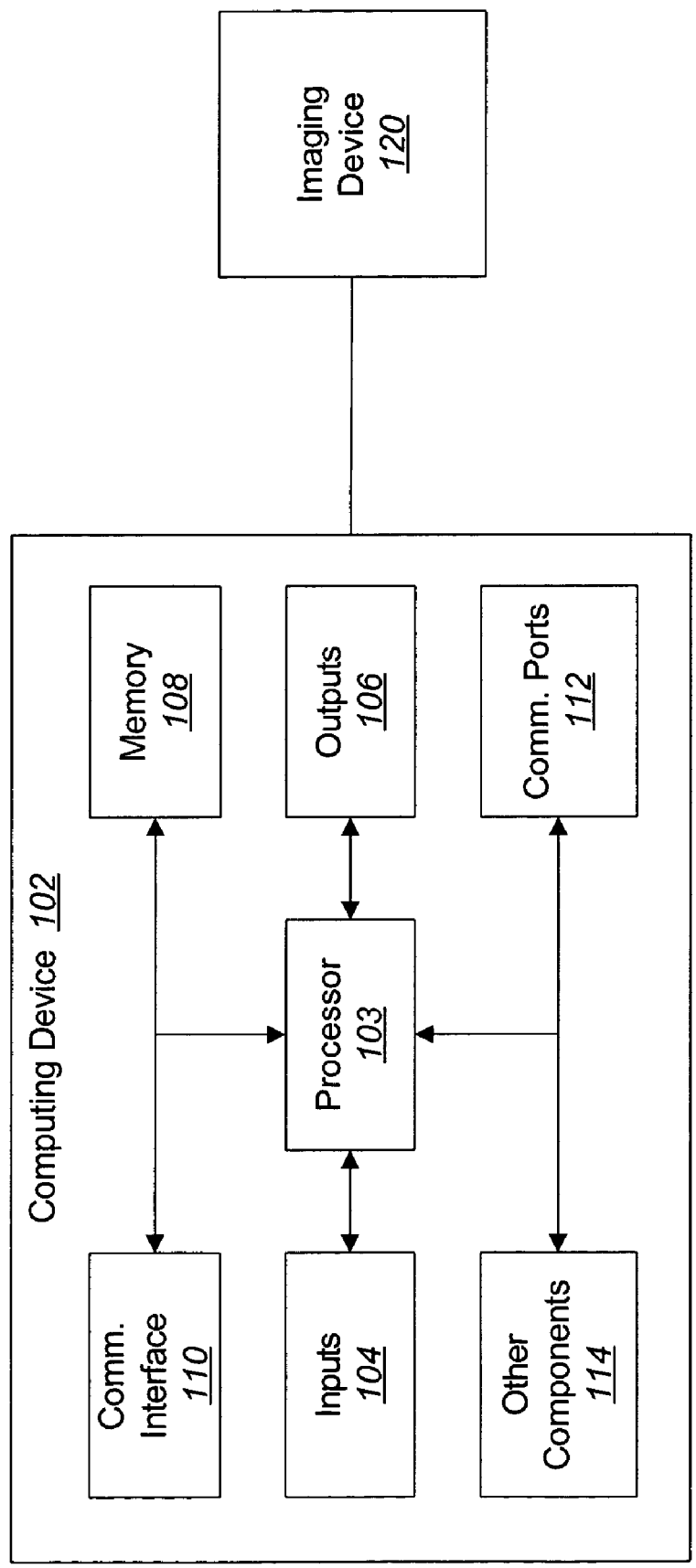
FIG. 1 is a block diagram illustrating the major hardware components typically utilized with embodiments herein.

A method for modifying settings in printing a document is disclosed. Document data is provided that comprises multiple graphical elements. The document data is converted into printing instructions. At least one setting is applied to the printing instructions. A preview is presented of the printing instructions to a user through a graphical display. The method enables the user to select a specific graphical element or specific multiple graphical elements from the preview and to change the setting to a new setting. The new setting is used when printing the document.

The user may be able to change the global settings. In some embodiments, a plurality of global settings may be applied to the printing instructions.

The printing instructions may comprise Render Independent elements (Graphics Device Interface (GDI) instructions), Device Dependent elements (DDI Instructions), Intermediate Format elements, Render specific elements (PDL elements, Tiff elements, PDF elements, or rasters).

Page segmentation may be performed by Render Independent elements (Graphics Device Interface (GDI) instructions), by Device Dependent elements (DDI Instructions), by Intermediate Format elements, or by Render specific elements (PDL elements, Tiff elements, PDF elements, or rasters). The page segmentation may be performed by region, by object, and the like.

Embodiments may automatically identify graphical elements for the user that exceed a predefined threshold.

Regarding the new setting, the user may be provided with the option of saving the new setting. The new setting may be localized to the specific graphical element and does not necessarily apply to the entire document. A device specific rendering may be simulated using the new setting.

Some embodiments may enable the user to select all the graphics in one or more pages from the preview. In addition, embodiments may enable the user to select a specific graphical element from the preview and to apply a security setting for controlling access to the specific graphical element.

A computing device configured for modifying settings in printing a document is also disclosed. The computing device includes a processor and memory in electronic communication with the processor. Executable instructions are included that are configured to implement a method for modifying settings in printing a document. Document data is accessed that comprises multiple graphical elements. The document data is converted into printing instructions. At least one setting is applied to the printing instructions. A preview is presented of the printing instructions to a user through a graphical display. The method enables the user to select a specific graphical element or specific multiple graphical elements from the preview and to change the setting to a new setting. The new setting is used when printing the document.

A computer-readable medium for storing program data, wherein the program data comprises executable instructions for implementing a method for modifying settings in printing a document, is also disclosed. Document data is accessed that comprises multiple graphical elements. The document data is converted into printing instructions. At least one setting is applied to the printing instructions. A preview is presented of the printing instructions to a user through a graphical display. The method enables the user to select a specific graphical element or specific multiple graphical elements from the preview and to change the setting to a new setting. The new setting is used when printing the document.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a block diagram illustrating the major hardware components typically utilized with embodiments herein. The systems and methods disclosed may be used with a computing device 102 and an imaging device 120. Computing devices 102 are known in the art and are commercially available. The major hardware components typically utilized in a computing device 102 are illustrated in FIG. 1. A computing device 102 typically includes a processor 103 in electronic communication with input components or devices 104 and/or output components or devices 106. The processor 103 is operably connected to input 104 and/or output devices 106 capable of electronic communication with the processor 103, or, in other words, to devices capable of input and/or output in the form of an electrical signal. Embodiments of devices 102 may include the inputs 104, outputs 106 and the processor 103 within the same physical structure or in separate housings or structures.

The electronic device 102 may also include memory 108. The memory 108 may be a separate component from the processor 103, or it may be on-board memory 108 included in the same part as the processor 103. For example, microcontrollers often include a certain amount of on-board memory.

The processor 103 is also in electronic communication with a communication interface 110. The communication interface 110 may be used for communications with other devices 102, imaging devices 120, servers, etc. Thus, the communication interfaces 110 of the various devices 102 may be designed to communicate with each other to send signals or messages between the computing devices 102.

The computing device 102 may also include other communication ports 112. In addition, other components 114 may also be included in the electronic device 102.

Many kinds of different devices may be used with embodiments herein. The computing device 102 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 1 is only meant to illustrate typical components of a computing device 102 and is not meant to limit the scope of embodiments disclosed herein.

The computing device 102 is in electronic communication with the imaging device 120. An imaging device 120 is a device that receives or transmits an imaging job, such as a Multi-Function Peripheral ("MFP") or computing device. Imaging devices include, but are not limited to, physical printers, multi-functional peripherals, a printer pool, a printer cluster, a fax machine, a plotter, a scanner, a copier, a logical device, a computer monitor, a file, an electronic whiteboard, a document server, etc. A typical imaging device, such as a physical printer, fax machine, scanner, multi-functional peripheral or copier is a type of computing device. As a result, it also includes a processor, memory, communications interface, etc., as shown and illustrated in relation to FIG. 1. The imaging device may be a single or a plural grouping (e.g., pool or cluster) of two or more devices.

In light of the definition of an imaging device 120 above, the term imaging job, as used herein, is broadly defined as any instruction or set of instructions that are sent to an imaging device to cause an image to be printed, imaged, scanned, converted, sent, etc., to or from the imaging device 120. Thus, the term imaging job includes, but is not limited to, a fax instruction or job to send a fax, a print job to print to a file, a print job to print to a particular window in a graphical user interface, a scan job to scan in an image from a scanner, a print job to print to a physical printer, a document manipulation job, a document conversion job, etc. Print jobs and printing devices are used to illustrate exemplary embodiments, but other kinds of imaging jobs and imaging devices may be used in implementations of the embodiments disclosed herein.

Figure 2:
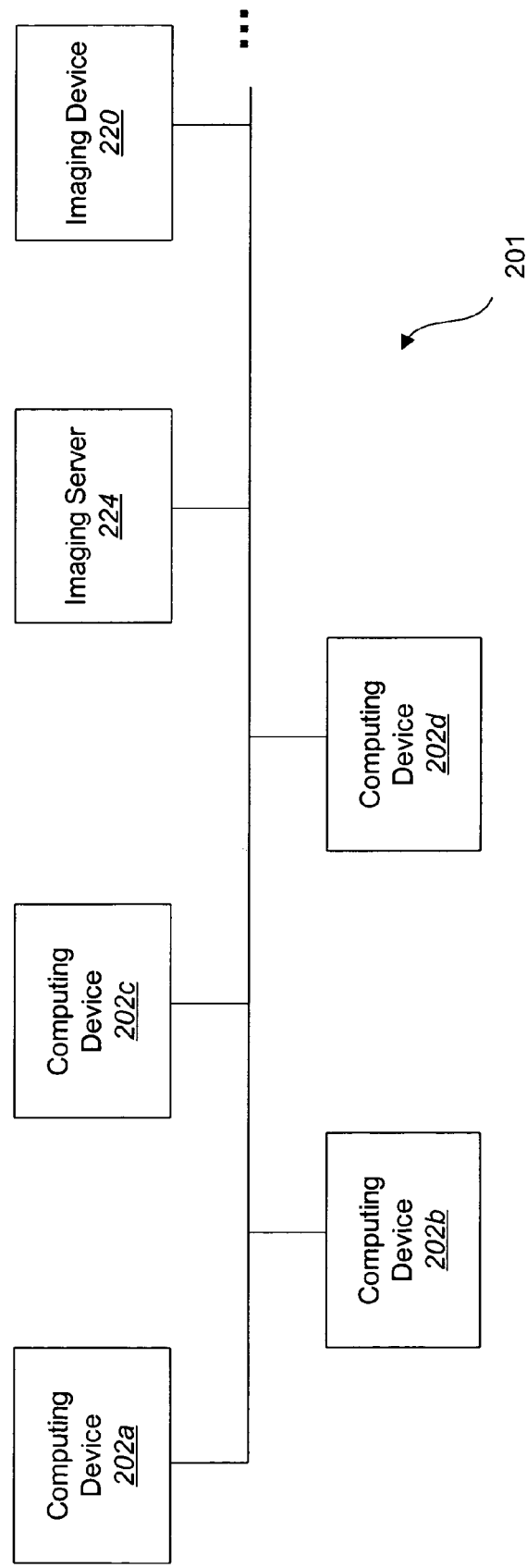
FIG. 2 is a network block diagram illustrating one possible environment in which the present systems and methods may be implemented.

FIG. 2 is a network block diagram illustrating one possible environment in which the present systems and methods may be implemented. The present systems and methods may also be implemented on a standalone computer system. FIG. 2 illustrates a computer network 201 comprising a plurality of computing devices 202, an imaging device 220 and an imaging server 224.

This invention is independent of the job control command and image data language and syntax. For example, the job control language may be PJL and the imaging job data language may be PCL or Postscript.

Herein, reference to computing devices that construct and despool an imaging job to, or receive from, either an imaging device or server, will be referred to as imaging clients. Herein, reference to computing devices that manage an imaging device and receive imaging jobs and respool the imaging job to/from an imaging device, will be referred to as imaging servers.

References to computing devices that construct and despool an imaging job to either an imaging device or server, will be referred to as client computing devices (i.e., client). Herein, reference to computing devices that centrally manage a shared imaging device by receiving despooled imaging jobs from multiple client computing devices and re-despools the imaging job to the imaging device, will be referred to as server computing devices (i.e., server).

The embodiments disclosed operate independently of how the imaging job is generated. For example, a print job may be generated by an application using a printer driver which spools a print job to the print spooler. By way of further example, the print job may be generated by direct printing using a utility that generates a print job ticket and despools the document data, in its native format, and job ticket directly to the printer.

The systems and methods herein are independent of the method to generate the imaging job and the method to despool the image job and/or imaging result to/from the imaging client and imaging device. For example, an imaging job may be generated by a printer driver from an application. The application would convert the document into printing instructions, such as GDI (i.e., Graphics Device Interface) in the Microsoft family of operating systems. The printing instructions would then be passed to a printer driver installed on the client and/or server associated with the printing device in the form of specialized printing instructions that take into account the device capabilities. In the Microsoft family of operating systems, these specialized printing instructions are known as DDI (i.e., Device Driver Interface) instructions. The printer driver would then convert the printing instructions into a printer dependent format, such as a raster image, Tiff, PDF, or PDL (i.e., Page Description Language) such as PCLXL or Postscript. In other cases, such as Direct Printing, the document format can be directly interpreted by the printer and there is no preprocessing of the document format into a printer dependent format.

The embodiments disclosed also operate independently of the protocol used between the client computing and imaging device to obtain the job completion status. For example, the protocol may be a proprietary protocol over TCP/IP, or an industry standard protocol such as LPR, 9100 and IPP.

The systems and methods of embodiments of the present invention typically comprise one or more printing devices, which may be connected locally, through a network or through a remote printing environment. These systems and methods may further comprise a computing device capable of generating or transmitting a print job to a printing device or transmitting the location of a print job to a printing device as in "pull printing." These embodiments may also comprise a printer driver, a spooler, a print processor and other print system components that process, transmit or otherwise function to produce a print job. In some embodiments, these components may exist in a Microsoft Windows 98, Me, NT, 2000, XP, 2003 Server® or similar operating system. Details of these operating system print system components and processes may be obtained by reference to the Microsoft Windows Driver Development Kits (DDKs) and associated documentation, which are hereby incorporated herein by reference.

Embodiments which utilize a Microsoft Windows® operating system generally comprise a printer driver, spooler, print processor, port monitor and other print system components which process print tasks generated through the operating system and applications running on the operating system. Embodiments used in conjunction with other operating systems will utilize print system components with similar functions, which may be referred to by the terms used in Microsoft systems.

Exemplary embodiments will be described with terminology related to a Microsoft Windows® environment, however these terms shall relate to equivalent elements in other operating systems. For example, the print processor described in many embodiments will relate to a print processor common in the Windows environment as well as elements with equivalent functions in other operating systems.

The definitions in this and subsequent paragraphs apply throughout this specification and related claims. The term "print job" may refer to any combination of data that can be printed. The term "printed" may refer to any task that renders data into hard or soft copy output. A print job may comprise text, line art and/or graphics and may comprise part of a page, a single page or many pages. Print jobs may be rendered or un-rendered. Generally, a print job is generated by an application, such as a word processor, spread sheet, etc., however, a print job may also comprise a file or data in memory that may be sent directly to a print process.

The term "network" may refer to any combination of computing devices and peripherals, such as printing devices, wherein the devices can communicate with each other. The term "network" may comprise Local Area Networks (LANs), Wide Area Networks (WANS) and many other network types. A network may be connected using conventional conductive cable, fiber-optic cable, phone line cable, power line cable or other electrical and light conductors and other signal transmission media as well as wireless connections using infrared, RF or other wireless methods.

To simplify discussion of a printing system used under a Microsoft Windows® operating system, some groups of system components may be referred to collectively. Some components may also be referred to generically by their group name. For example, a spooler API server may be referred to as a spooler. A group of components comprising a spooler client interface, spooler API server, router, print job creation API and job scheduling API may be referred to as a spooler in a Windows NT/2000 operating system. A group of components comprising a language monitor, port monitor and port driver stack may be referred to as a port manager. A group of components comprising a file format director and EMF print processor DLL may be referred to as a print processor.

Equivalent component groups may also be referred to by these terms whether in a Microsoft operating system or another system.

References to a Microsoft Windows® or Windows operating system may refer to any version or variation of a Microsoft Windows operating system comprising Windows 95, Windows 98, Windows NT, Windows 2000, Windows ME, Windows XP, Windows 2003 Server and others. While exemplary embodiments may be directed to a Windows operating system and environment, systems and methods directed to other operating systems such as Macintosh, UNIX, DOS, Linux, IBM MVS and AS/400 and others are to be contemplated within the scope of the present invention.

Embodiments may be embodied in software, firmware, hardware and other forms that achieve the function described herein. As embodiments may be adapted to many environments with varying computing devices, operating systems, printing devices, network hardware and software, applications and other variables, these embodiments may take many forms to achieve their function. Some embodiments may also be transmitted as signals, for example, and not by way of limitation, embodiments may be transmitted as analog or digital electrical signals or as light in a fiber-optic line. All of these embodiments are to be considered within the scope of the present invention.

In a typical printing environment, a user may initiate a print job, which generally comprises a single document generated by an application that is to be printed. In some embodiments of the present invention, a user may also initiate a print task, which may comprise one or more documents consisting of one or more pages each. A print task may also comprise multiple copies of a print job. A print job or task may be pre-processed into printer-ready data, such as output in a page description language (PDL) such as Printer Control Language (PCL), Adobe Postscript®, Adobe Portable Document Format (PDF) and Tagged-Image File Format (TIFF) as non-limiting examples. A print job or task may also be journaled. In a journaled print job or task, rendering instructions are recorded for subsequent playback. Some examples of journaled formats are Enhanced Metafile (EMF) and Sharp's Printer Meta file (PMF).

Generally, when a print job or task is initiated, a user makes an input selection to initiate the process. The initiating device, such as a computing or printing device may respond with the display of a dialog such as a print dialog box, a command line query, a panel display or some other form of user interface that allows a user to select print task options. One option may be the selection of the printing device such as a printer, plotter, Multi-Function Peripheral (MFP), CD burner or other device. Once the printing device is selected, a driver and, optionally, a print processor and other print system components may be loaded. Once the driver and/or other print system components are loaded, an additional dialog may be presented to prompt a user of options available on the selected device. Options such as print quality, paper size, orientation, tray selection, manual feed, stapling, watermarks, cluster printing, pool printing and other options may be selected.

Once printing options have been selected or otherwise established, either manually or automatically, print job or task processing may commence. Print job or task processing may comprise construction of print job or print task specific information by the printer driver. This may comprise device initialization and environment data such as DEVMODE data in a Microsoft Windows® environment. Rendering instructions are then compiled and either recorded for deferred playback (journaled data) or processed into printer-ready data. In some cases, a print task may be partially or wholly rendered into printer-ready data in a previous step and the compilation of rendering instruction may be skipped or partially skipped.

The output from a print driver, in a spooled print environment, may be referred to as a spool file and its contents may be referred to as spool data. A spool file may be recorded on disk, in memory, in cache or other storage media compatible with a computing device. In embodiments herein, a spool file may comprise interleaving data. Interleaving data may comprise printer output mode options such as, but not limited to, output tray options, output page orientation, output page location, media selection or other criteria affecting aspects of printing device output.

When the spool file is complete, control is passed from the driver to another print system component. In some systems, control is passed to a print processor, which may determine whether the data is in a printer-ready format and process the data accordingly. If the data is in a printer-ready format, it may be sent to the port of the selected printing device. If the data is journaled, it may be further processed into a printer-ready format. This process may be referred to as spooling as the data is spooled from the spool file to its destination. Once journaled data is processed into printer-ready data, it may be despooled to the port associated with its destination printing device.

When printing a document composed of a mix of graphical display elements to a color printer, users desire a high quality color rendering of the output across all the graphical elements. Because graphical elements may differ in characteristics from each other in the same document, an application of rendering methods applied uniformly across all the graphical elements may not result in the desired output (while it may for some) for all outputs.

The aforementioned is generally not a problem when the user desires to render an output (hard or softcopy) of a single graphical element. For example, if one wants to print a single image, such as a TIFF or JPEG image, the user can use an application upstream from the print generation process to edit/manipulate the image until it achieves the desired characteristics. For example, the user may alter tones, output intent, remove red-eye, etc. Adobe Photoshop® is an example of an application that supports editing/manipulating the rendering of an image upstream from the print generation process (e.g., printer driver in Microsoft Windows®).

In modern document processing application environments, a user may have the ability to edit/manipulate the desired rendering of a page, or individual graphical elements of the page based on the type of graphical element, upstream from the print generation process. Quark Express and Microsoft Word® are examples of applications that support some modification of the desired rendering of individual page or graphical elements, respectively. These methods still suffer in that: (1) the rendering manipulations are done with little knowledge of the output device's custom capabilities, thus the faithfulness of the display is severely limited, and (2) since they have no knowledge of the device specific capabilities that are private, they can't take advantage of these device specific capabilities. Examples might include: half-tone algorithms, color tables, color calibration, special image processing operations such as red eye removal, etc.

In other methods, a page image may be edited/manipulated in an application and device independent format, prior to rendering. For example, an imaging subsystem may convert the document specific data into device independent data (e.g., EMF in Microsoft Windows®) and pass the device independent data to an application where the device independent data is rendered for the display device for previewing and page editing. Sharpdesk Composer® is an example of this method.

In another variant of the above method, the page images are Raster Image Processed (RIP'd) in the output device (instead of on the host). A copy of the RIP image is then sent back to the host for proofing by simulating the rendering on the host's display device. The user may then make some final adjustments to the page images before releasing the outputting process on the device.

In yet another method, the printer driver allows separate settings to different classes of graphical elements, such as text, vector and bitmaps. But the settings are still applied globally and uniformly across all the graphical elements within the associated class.

Therefore, there is a desire to have an effective method of editing/manipulating the desired device specific rendering of individual graphical elements within a document. The use of the term "document" herein refers to any output generated by an application or computer program that is to be printed including, but not limited to, a web page, a graphics file, a spreadsheet, a database record, a word processing document, composite documents, ASCII text, graphs, etc.

Figure 3:
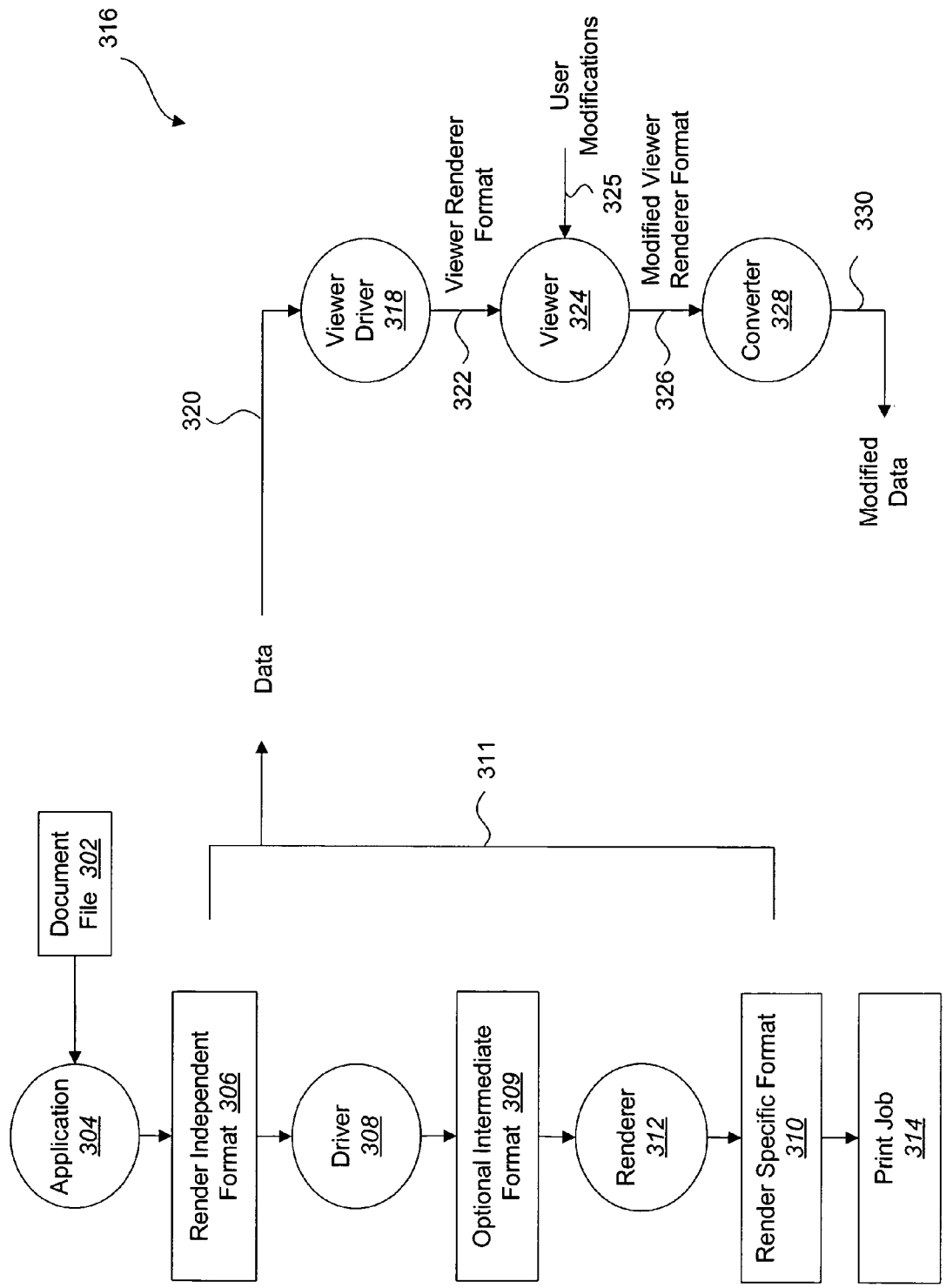
FIG. 3 is a block diagram illustrating a general system for allowing a user to change settings selectively.

The disclosed embodiments of the present invention describe an effective method for obtaining the desired rendering for a specific device of individual graphical elements within a print job. FIG. 3 is a block diagram illustrating a general system for allowing a user to change settings selectively. A document file 302 is the file that is native to the application 304. The application generates a render independent format 306 version of the file. This format is commonly known in Windows as GDI commands (Graphical Device Interface) and is considered device independent. While this format may take into account certain characteristics of the device, such as the printable area, the resolution, the color tables, etc, it can be used on any device with these characteristics, and thus is commonly called "device independent". In the embodiment shown in FIG. 3, the printer driver 308 takes as input the render independent format 306 in the form of DDI (Driver Device Interface) commands (not shown in the figure). The driver 308 may optionally generate an intermediate format 309. This intermediate format 309 is optional, and is commonly used for temporary storage of partially processed data (to enable reverse order, pamphlet printing, etc.) This optional intermediate format 309 is processed by a renderer 312 to generate a render specific format 310 and a print job 314.

The process 316 that allows a user to view the document and/or image and alter settings relating to the document and/or image is shown in FIG. 3. This process 316 may take place anytime after the render independent format 306 has been generated and before the print job 314 by using any of the printing instructions 311 (Render Independent elements 306 (Graphics Device Interface (GDI) instructions), Device Dependent elements (DDI Instructions, not shown), Intermediate Format elements 309, Render specific elements 310 (PDL elements, Tiff elements, PDF elements, or rasters)). For example, this process 316 may take the render independent format 306 and process it as will be described. Alternatively, the render specific format 310 may be processed as will be described. Further, the optional intermediate format 309 may be processed as will be described.

In the process 316 a viewer driver 318 takes data 320 as input. The data 320 may be the render independent format data 306, the render specific format 310 data, or other format of data that is accessible and available in the process of printing a document. The viewer driver 318 generates viewer renderer format data 322 that may be used by the viewer 324 to view the document. The user uses the viewer 324 to view the document and determine if any settings should be changed or other alterations made. User modifications are processed by the viewer 324 to change the viewer renderer format data 322 to modified viewer renderer format data 326. The modified viewer renderer format data 326 is converted by a converter 328 back to the appropriate format as modified data 330. For example, if the process 316 takes as input render independent format data 306, the process would typically return render independent format data 306, which may have been modified, as output 330.

In one embodiment of the process 316, the viewer 324 may be programmed so that it can read in data directly without having to have it first translated into a viewer renderer format.

More generally speaking, as is customary in current art, document data consisting of multiple graphical elements (e.g., text, vector, bitmaps) is converted into printer ready data (e.g., PDL, Tiff, PDF, or raster) in a print data generation process (e.g., printer driver). As part of the print generation process, the user specifies settings about the desired output rendering. These settings are then typically applied globally and uniformly to all graphical elements, or to classes of graphical elements. In some cases, the printer driver may also perform some automatic adjustment, which differs from one graphical element to another, based on some predefined algorithm. Once the settings have been determined, the document data is sent to the print generation process for rendering into printer ready data for a specific device output intent (exemplary operating environment).

After the print generation process converts the document data into printer ready data (e.g., PDL) or some intermediate representation (e.g., Sharp's Printer Metafile: "PMF"), the process presents the user through use of a viewer 324 with a soft proof in a graphical display. The soft proof consists of some visual representation of the pages to be imaged on the device, such as a thumbnail display of each page. For each page proof, the page is segmented into multiple imaged elements (such as individual graphical elements, logical groupings of elements, or regions).

For each segmented element, which might be displayed as a thumbnail, the user can select the element for individual override of the global settings. When selected, the element would be displayed by simulating the device specific rendering within a user interface (UI) on the display device (e.g., monitor). The user can then alter the settings (e.g., color output intent, resolution, red-eye removal, edge enhancement, half-toning, etc.) for the specific element by entering user modifications 325. Optionally, the viewer 324 then simulates the device specific rendering of the element according to the altered settings. The user has the option of applying or canceling the altered settings, returning back to the original settings or some intermediate (previous) applied settings. The user can iterate as many times as he wishes in this process until he is satisfied with the settings.

An added piece of functionality may allow the user to select the whole page or multiple pages. An alternative embodiment may bypass the page segmentation, or one or more arbitrary rectangles (by dragging the mouse).

Upon completion of the process, any altered settings to one or more segmented elements are then applied to the printer ready data (i.e., the printer ready data is modified accordingly). In the exemplary operating environment, a document consisting of multiple instances of graphical elements (e.g., text, vector, bitmaps) is rendered into printer ready data for a specific device output intent by a print generation process. In the preferred embodiment, the device is a color device. In another embodiment, processing instructions are added (or changed) to the job, to the page, or inside the page. If the processing instructions are added to the job, they can be inserted in the PJL (Printer Job Language) instructions outside of the PDL (Page Description Language, such as PCL or Postscript) or other printer data formats (Tiff, PDF, or rasters), making it simpler to process, and making the same PJL instructions work for different PDLs or printer data formats.

As is customary in current art, during the initiation of the print data generation process (i.e., rendering to the device's input), global settings for how to render all graphical elements, or class of, are determined, such as by user selection or an input dialog, predefined selections, or automatic selection mechanism. These settings are then applied uniformly across all graphical elements, classes of, or by subsets according to some predefined method.

Figure 4:
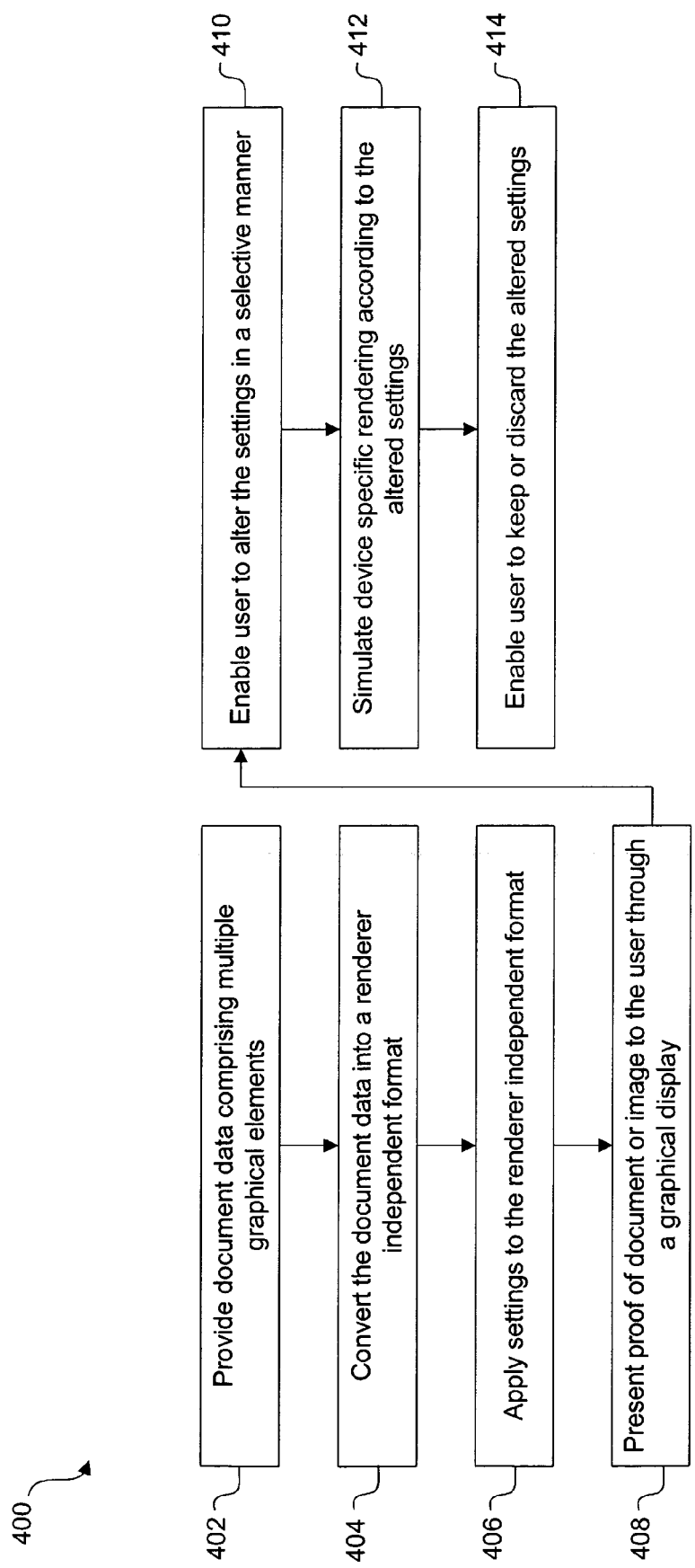
FIG. 4 is a flow diagram of one method for enabling a user to alter settings in a selective manner.

In an exemplary embodiment, the settings correspond to image enhancement for a color output device. Examples of settings might include:

Auto Color Correction
Manual Color Correction
Conversion to Gray Scale (or BW)
Output Intent—Business Graphics vs. Color
Red-eye Removal
Image Quality (Best, Normal, Econo)
Half-tones Referring now to FIG. 4, a method 400 for enabling a user to alter settings in a selective manner is shown. Document data comprising multiple graphical elements is provided 402. The document data is converted 404 into a renderer independent format. Settings are applied 406 to the renderer independent format. A proof of the document or image is presented 408 to the user through a graphical display. The method then enables 410 a user to alter the settings in a selective manner. Optionally, device specific rendering is simulated 412 according to the altered settings. The method then enables 414 the user to keep or discard the altered settings.

Figure 5:
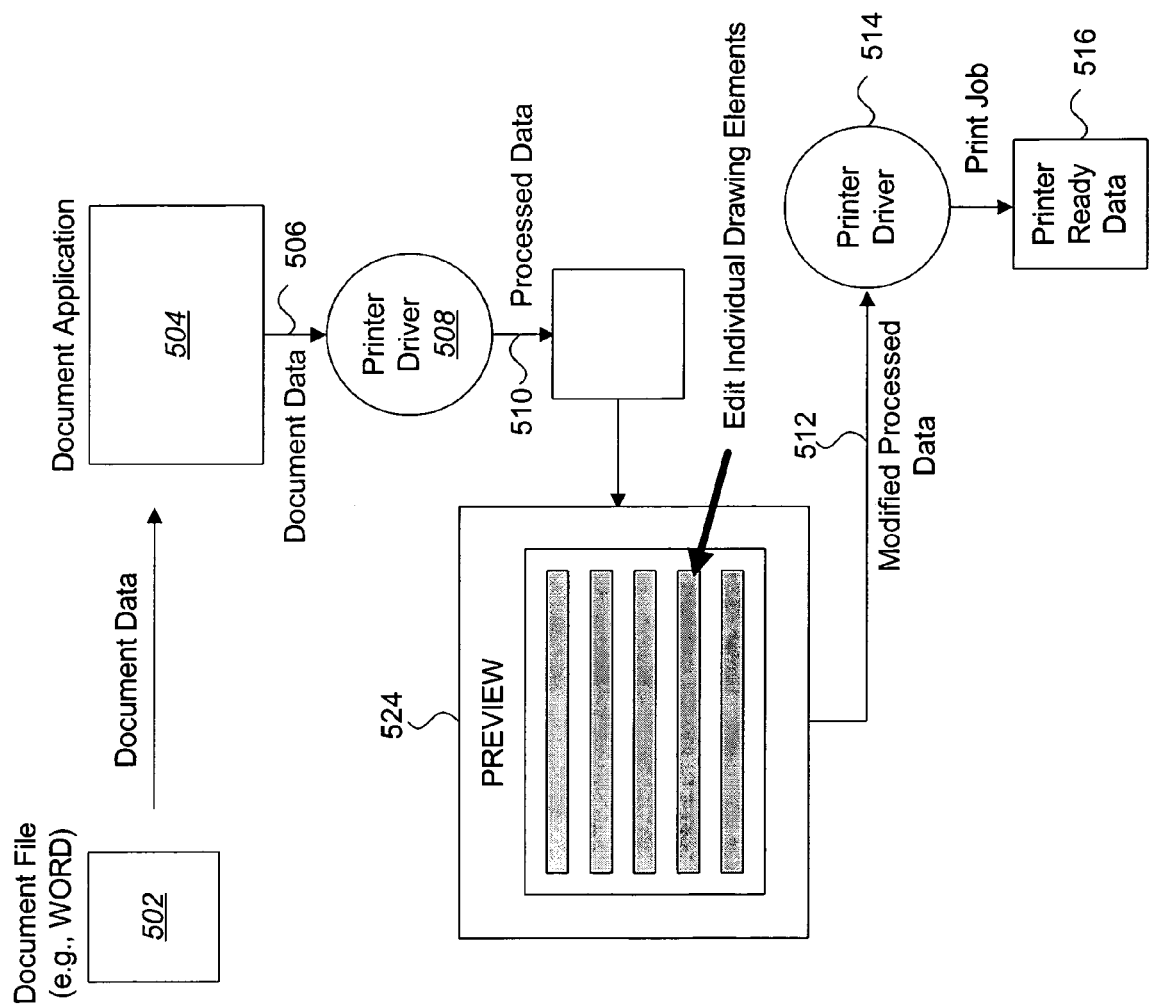
FIG. 5 is a block diagram illustrating the occurrence of page segmentation.

FIG. 5 is a block diagram illustrating the occurrence of page segmentation. The document application 504 uses the document file 502 to generate document data 506, which is processed by a printer driver 508 and, at some point, is used to generate a preview for the user to modify the document.

In the embodiments herein the print generation process partitions the document data 506 into pages, where a page may represent a logical document page or a physical output surface. Each page is then displayed 524 in a visual manner, such as a graphical user interface, to the user for soft proofing.

Each page may be displayed in any form, such as a full resolution or thumbnail view, and may additionally be captioned or annotated such as its corresponding page number. The soft proofing process may occur at any stage in the print generation process, such as prior to processing, an intermediate stage (i.e., pre-rendering), or after the document data 506 has been rendered into printer ready data.

The document data 506 is taken by the printer driver 508 and converted into processed data 510. Several examples will be given of different kinds of processed data 510. The processed data 510 is then partitioned into logical or physical pages for display 524 in the soft-proofing process. As a result of the soft-proofing process, to be discussed later, the processed data 510 may be modified reflecting the changes in settings. The modified processed data 512 would then be passed to the print generation rendering process 514. The print generation rendering process would then render the modified processed data 512 into printer ready data 516 for a specific device output. Several more specific examples will now be given.

In one embodiment the processed data 510 may be journaled data. For example, in the MS-Windows GDI print subsystem, an application 504 converts the document data 502 into a device independent representation referred to as graphical display instructions (GDI). These instructions are then passed to the printer driver 508 associated with the selected installed printer. The printer driver 508 would journal these instructions (i.e., not process them), partitioning them into logical or physical pages for display 524 in the soft-proofing process.

As a result of the soft-proofing process, to be discussed later, the journaled instructions may be modified reflecting the changes in settings. The modified journaled instructions would then be played back to the printer driver 514. The printer driver 514 would then render the modified journaled instructions into printer ready data 516 for a specific device output.

In another embodiment, the processed data 510 may be intermediate data. In this example the print generation process receives the document data (or some other device independent form of the data such as GDI in MS-Windows GDI print subsystem), performs some initial processing and converts the document data into an intermediate representation (i.e., pre-rendering). Examples of some initial processing may include rescaling/repositioning logical pages into sheet surfaces for sheet assembly emulations such as N-up, print sets and booklet printing, or for binding operations such as margins for folding and trimming operations. The intermediate representation (IR) data would then be partitioned into logical or physical pages for display 524 in the soft-proofing process.

As a result of the soft-proofing process, to be discussed later, the IR data may be modified reflecting the changes in settings. The modified IR data would then be passed to the print generation rendering process. The print generation rendering process would then render the modified IR data into printer ready data 516 for a specific device output.

Examples of IR data include Sharp's Printer Metafile Format (PMF), which may be used as a transitional representation for a page description language (PDL) rendering, and an encoded bitmap representation (i.e., image format), which may be used as a transitional representation for a raster rendering.

In another embodiment, the processed data 510 may be rendered data. In another example, the print generation process fully renders the document data or some other device independent form of the data into printer ready data for a specific device output. A post-rendering process then partitions the rendered data into logical or physical pages for display 524 in the soft-proofing process.

As a result of the soft-proofing process, to be discussed later, the rendered data may be modified reflecting the changes in settings. The modified rendered data would then be outputted as the result of the print generation rendering process.

Figure 6:
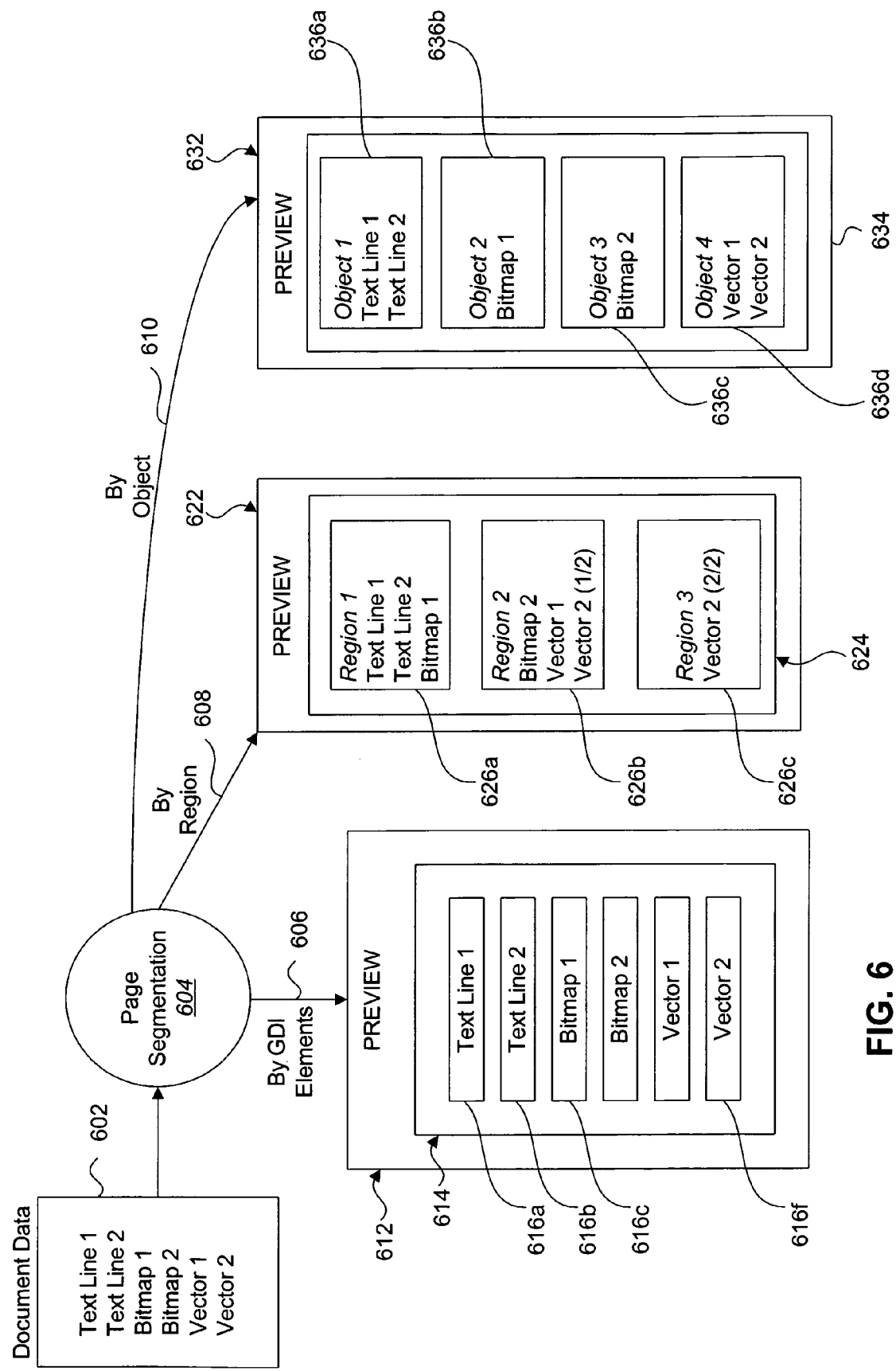
FIG. 6 is a block diagram illustrating the examples of pages being segmented according to different criteria.

Referring now to FIG. 6, pages may be segmented 604 according to various criteria. As part of the soft-proofing process, each page may be selected for previewing. As part of the previewing process, the page may be segmented 604 into graphical element collections, which may comprise individual graphical elements, logical groupings of elements or regions (e.g., bands). The graphical collections may be displayed within the page by any means, such as full resolution or thumbnail views. Additionally, which types of graphical collections are displayed or the means of displaying may be selectable. For example, one could choose to display only graphical collections that contain a bitmap graphical element. In another example, one could choose to display text in full resolution and bitmaps as thumbnails.

FIG. 6 illustrates the examples of pages being segmented by GDI elements 606, by region 608 and by object 610. Other types of segmentation are possible. The GDI elements 606 segmentation illustrates a preview 612 of the page 614 made up of a number of GDI elements 616. While FIG. 6 shows "GDI elements" as the printing instructions, embodiments may also use DDI elements, Intermediate format elements, PDL elements, Tiff elements, PDF elements, or individual rasters (in case of a raster driver). The region 608 segmentation illustrates a preview 622 of the page 624 made up of a number of regions 626. The object 610 segmentation illustrates a preview 632 of the page 634 made up of a number of objects 636. Objects can be defined as a logical grouping of printing elements based on some algorithm. As an example, an object might be a set of vector graphics that form a chart, even if the chart covers an irregular region. In another example, an object might be all lines thicker than 5 pixels.

Figure 7:
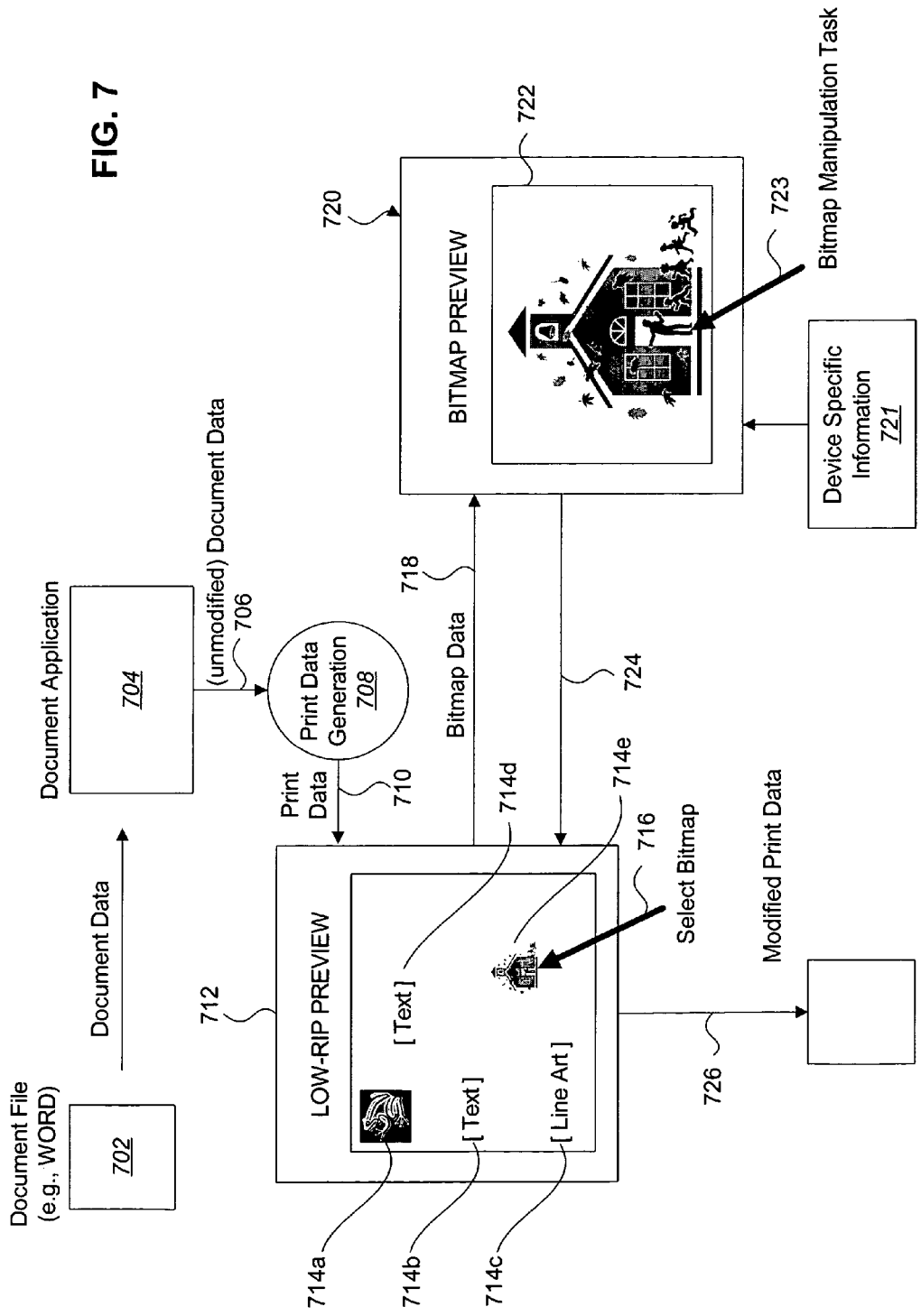
FIG. 7 is a block diagram illustrating that a user may select a graphical collection.

FIG. 7 is a block diagram illustrating that a user may select any graphical collection. The document file 702 is processed by the document application 704 to generate document data 706. A print generation process 708 creates print data 710 from the unmodified document data 706. A low-RIP preview (a reduced view, or one of less quality) 712 is presented to the user that includes a number of graphical collections 714. Within the soft-proofing preview process 712, the user can select 716 any graphical collection 714. For example, if the page is segmented into individual graphical instructions, and the page contains multiple bitmaps, the user could select an individual bitmap 714e.

When a graphical collection 714 is selected, the soft-proofing preview process 712 then simulates the device specific rendering of the graphical collection 714e in a device specific simulation preview 720 that uses the bitmap data 718 to create the preview 720. The device specific simulation preview 720 uses device specific information 721 in order to generate a device specific simulation preview 720. The device specific information 721 is information about the specific device the document and/or image is to be printed on that enables a device specific simulation preview 720 to be generated. From the device specific simulation preview 720, the user may edit/manipulate the desired rendering of the graphical collection illustrated as a bitmap manipulation task 723. The updated image 724 may be saved and used in the low-RIP preview 712. When the user is done previewing the document and/or images, modified print data 726 may be saved and used in a printing operation.

Although the example of FIG. 7 illustrates a bitmap (i.e., bitmap data 718, bitmap preview 720, bitmap manipulation task 723), the embodiment may also use any graphical element including, but not limited to, text, business graphics, vector graphics, etc. Thus the preview 720 may be a text preview, a business graphics preview, a vector graphics preview, etc. Accordingly the use of a bitmap as an example is not meant to limit the use of the present systems and methods to bitmaps and it is understood that other graphical elements may also be previewed and processed according to the present embodiments.

Figure 8:
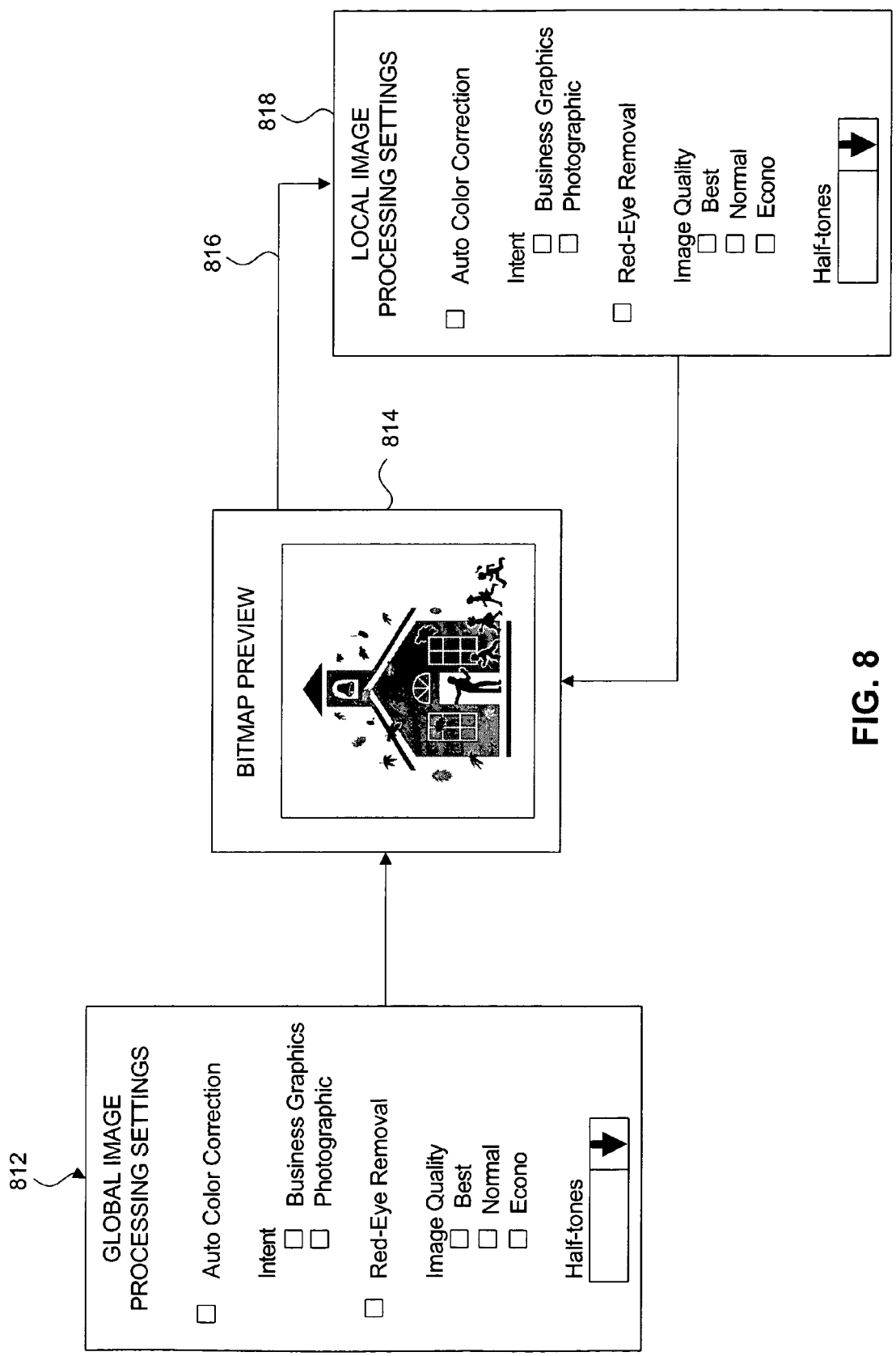
FIG. 8 is a block diagram illustrating that global image processing settings may be overridden by more local settings.

FIG. 8 is a block diagram illustrating the details of a bitmap manipulation task 723 mentioned above, where global image processing settings may be overridden by more local settings. Items within FIG. 8 that have already been discussed herein may be illustrated in FIG. 8 through the use of like numbering. When the graphical collection is soft-proof previewed 814, the preview 814 reflects the application of all global settings 812 which affect the device specific rendering of the graphical collection, such as those discussed in the exemplary environment. The user may then override 816 any of the global settings 812 with a new setting 818 that is localized to the graphical collection. The soft-proof preview process 814 then re-renders the graphical collection to reflect the altered settings 818. The user also has the choice of applying, canceling, or undoing previous altered settings. When completed, the user submits the altered settings, if any, and the print data for the graphical collection is modified accordingly.

Figure 9:
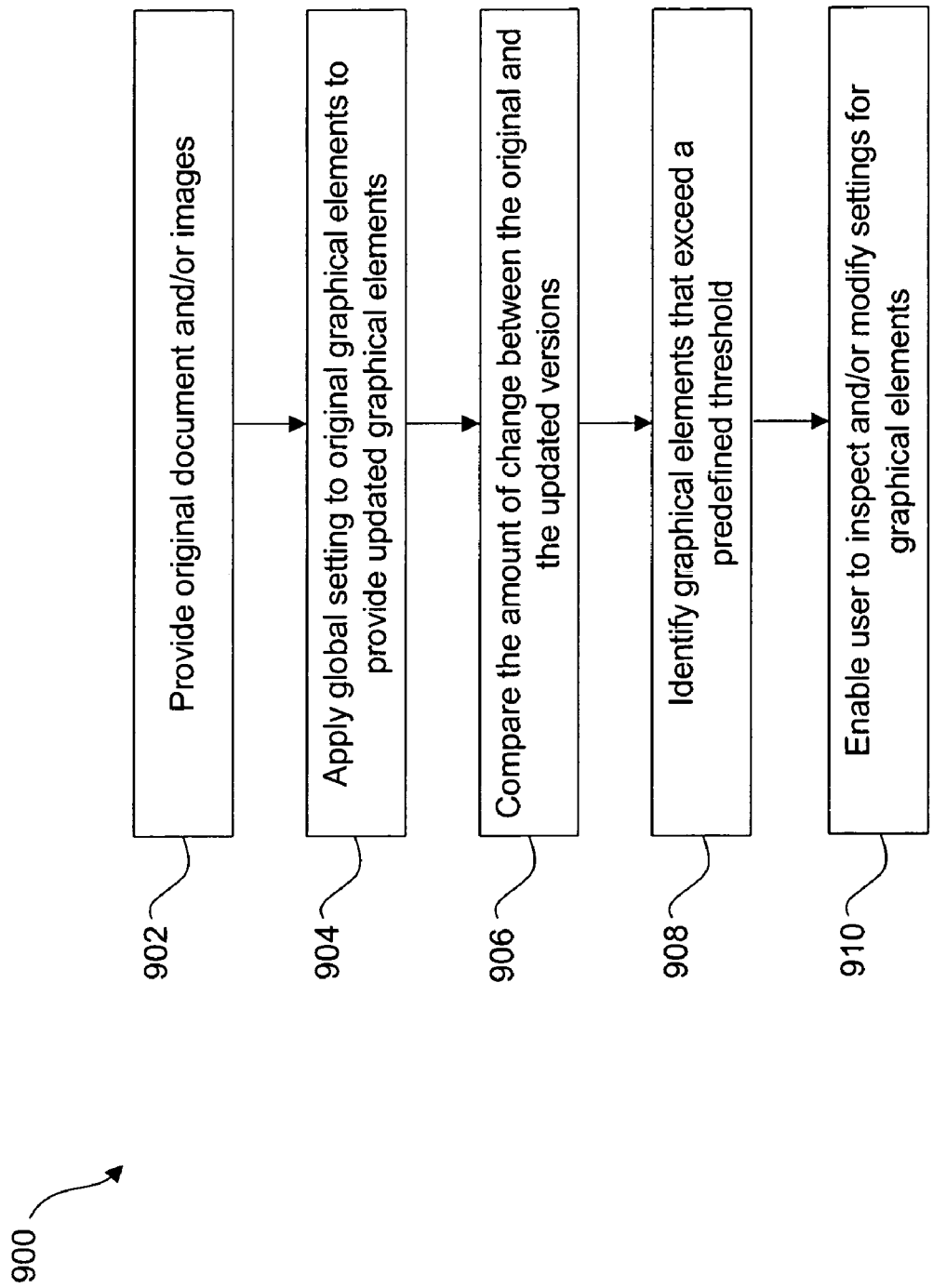
FIG. 9 is a flow diagram of a method for using a threshold to automatically identify for the user items for potential settings changes.

FIG. 9 is a flow diagram of a method 900 for using a threshold to automatically identify for the user items for potential settings changes. In this method 900 the soft-proofing preview process may also aid the user in identifying candidate graphical collections for the user to inspect for potential setting changes. For example, the process might use a threshold method. An original document and/or image is provided 902. This input data could be the original Render Independent data, the Render specific data, any intermediate data, or the final print data. The process can be iterated multiple times, so that the output data is the input data for the next cycle. In this method, the print data generation process compares 906 the amount of change between the original and the updated graphical collection after application 904 of the global settings. The soft-proofing preview process may then identify 908 graphical elements that exceed some predefined threshold of amount of change, or relative threshold to other graphical collections. The soft-proofing process may then identify, by any means (e.g., highlighting), the identified graphical collections in the soft-proofing process. The user is given the ability 910 to inspect and/or modify the settings for the graphical elements.

Figure 10:
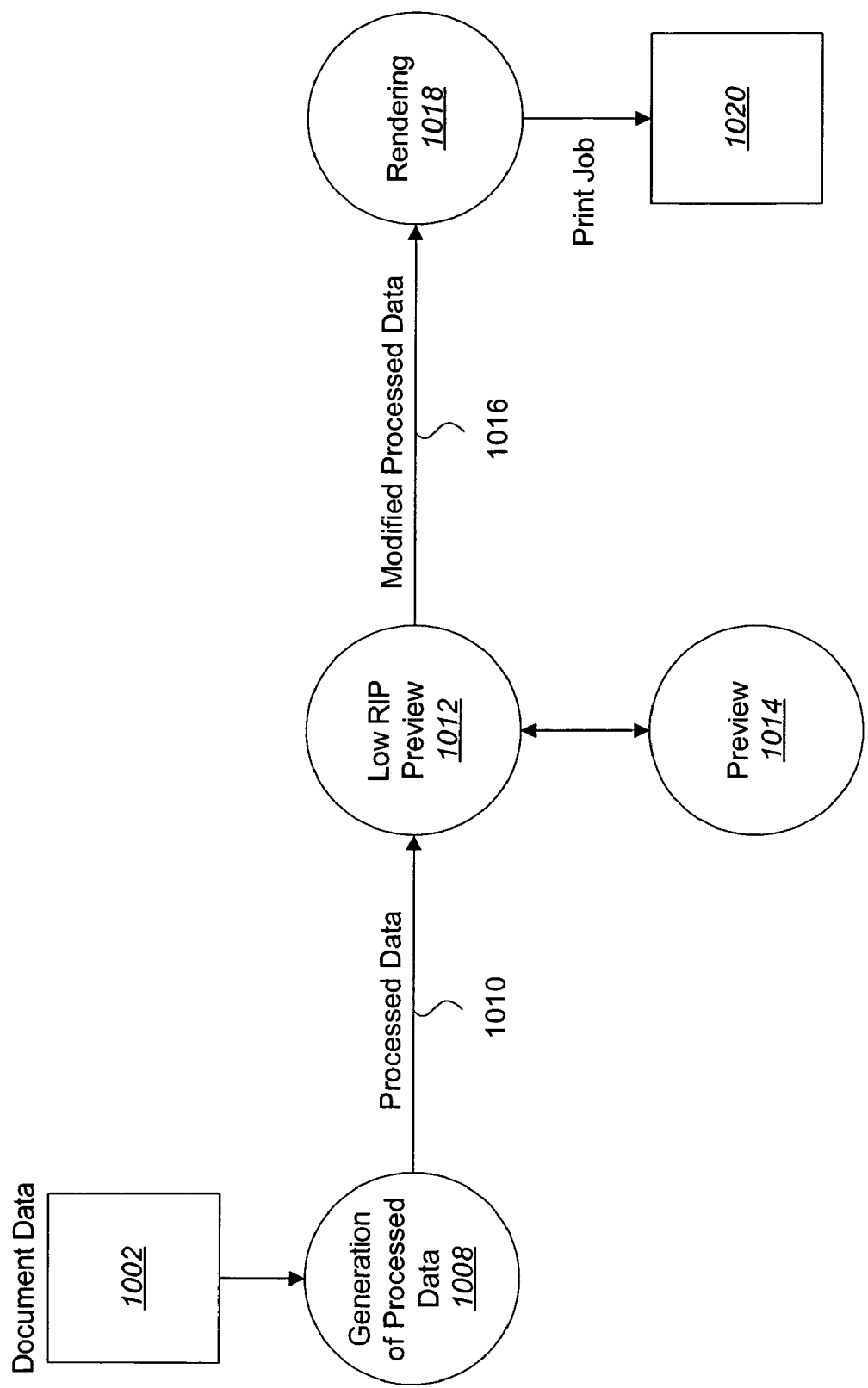
FIG. 10 is a block diagram illustrating a pre-processing embodiment implemented in a printer driver.

FIG. 10 is a block diagram illustrating a pre-processing embodiment implemented in a printer driver. The document data 1002 is taken as input by a generation of process data 1008 to create processed data 1010. The processed data 1010 is taken by the low RIP preview 1012 to create a low RIP preview of the processed data 1010. A user may select an item from within the low RIP preview to create a preview 1014 of the item. The preview 1014 may be used to enable the processed data 1010 to be modified into modified processed data 1016. The modified processed data 1016 may be rendered by a rendering process 1018 to create a print job 1020.

The more general block diagram of FIG. 10 may be implemented in specific ways depending on the embodiment. For example, in one embodiment the generation of process data 1008 may be a journaling process that creates journaled data. In this embodiment the modified process data is modified journaled data.

In another specific embodiment of FIG. 10 of pre-rendering implemented in a PDL driver, the generation of processed data 1008 may be a pre-rendering generation process that creates intermediate representation data. The modified processed data is modified intermediate representation data in this embodiment.

In another specific embodiment of FIG. 10 of pre-rendering implemented in a raster driver, the generation of processed data 1008 may be an image generation process that creates image data. The modified processed data is modified image data in this embodiment.

Figure 11:
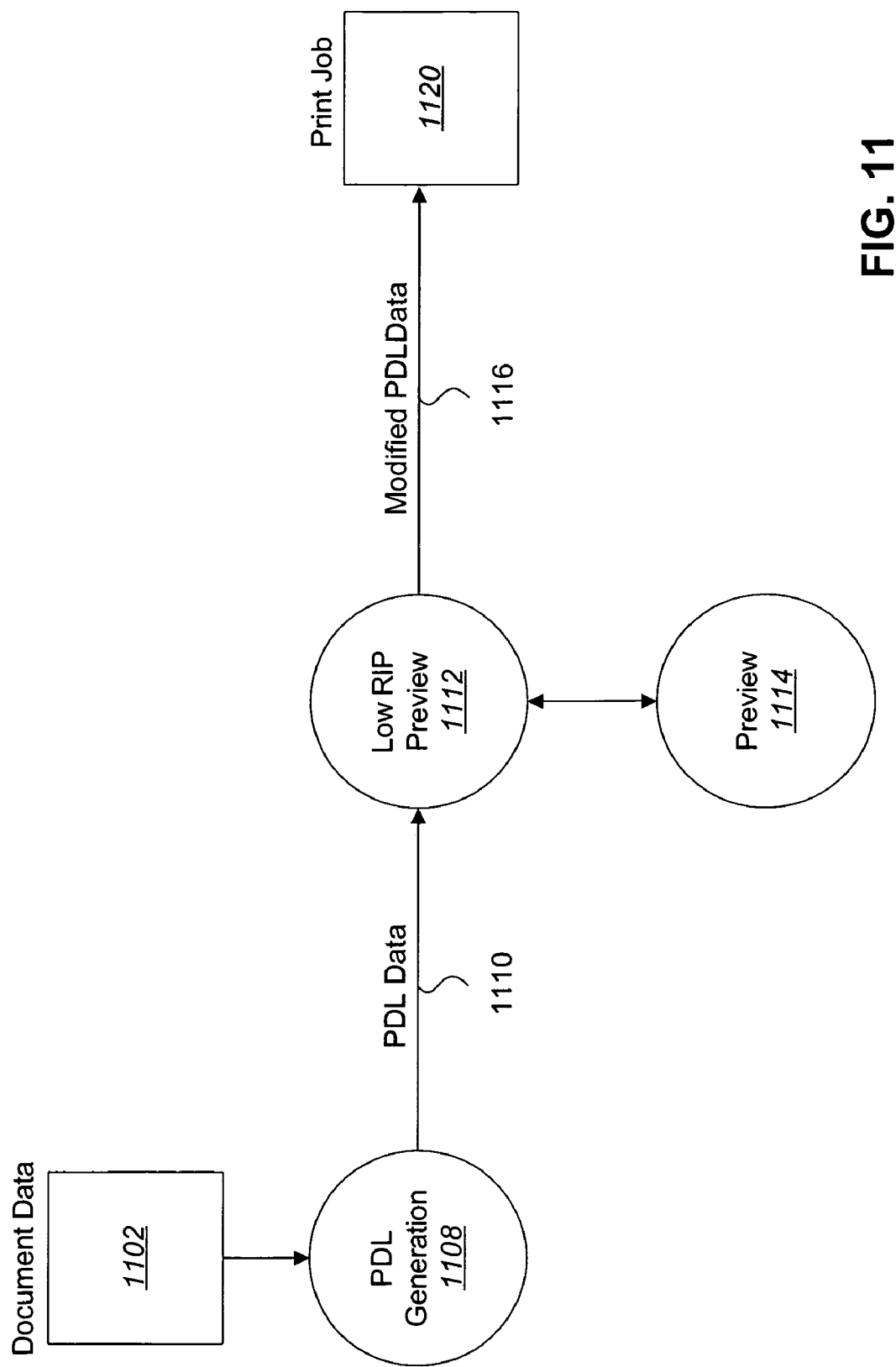
FIG. 11 is a block diagram of a post-rendering embodiment implemented in a PDL driver.

FIG. 11 is a block diagram of a post-rendering embodiment implemented in a PDL driver. Document data 1102 is taken by a PDL generation process 1108 to create PDL data 1110. The PDL data 1110 is taken by a low RIP preview process 1112. A preview 1114 may be generated for an item identified in the low RIP preview 1112. The PDL data 1110 may be modified through use of the preview 1114 to create modified PDL data 1116.

In one embodiment, the editing/manipulation process on individual graphical collections may be used for security/ access control purposes. For example, the print job is rendered to be saved on the device for repetitive recall for printing (i.e., Job Retention). In this example, the user chooses to control access, such as by an access or encryption key, to subparts of the print job (e.g., individual pages, chapters, bitmaps, etc.). The above method could then be used to apply the access codes or encryption on individual graphical collections. Users on subsequent recalls would only obtain access to the portions of the print job for which they have access codes or decryption keys.

In another embodiment, the processing of the selected graphics consists of obliterating the graphic by either not printing it at all, or by blacking out (or filling with a pattern) the graphic so it is not visible. This could be used for printing documents with sensitive information blacked out.

Other embodiments include other imaging operations which render an output in either soft or hardcopy format, such as fax, scan, copy, and document management, such as document archive/retrieval, manipulation and transfer.

The present systems and methods may be implemented in many different embodiments. Other embodiments include but are not limited to the print subsystems of the Microsoft Windows® Operating System, the Apple MacIntosh operating system, the Linux operating system, UNIX operating systems such as System V Unix operating systems, BSD Unix operating systems, OSF Unix operating systems, Sun Solaris operating systems, HP/UX operating systems, IBM AIX, and other operating systems including, but not limited to, IBM Mainframe MVS operating system (OS/390) and IBM AS/400.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for modifying settings in printing a document, the method comprising:
    providing document data that comprises multiple graphical elements;
    converting the document data into printing instructions by a printer driver, wherein the printing instructions comprise Render Independent elements (Graphics Device Interface (GDI) instructions) or Device Dependent elements (DDI Instructions);
    applying at least one setting to the printing instructions;
    presenting a first preview of the printing instructions to a user through a graphical display, the first preview comprising the multiple graphical elements, wherein the first preview is presented after the document data has been converted into printing instructions by the printer driver;
    presenting a second, different preview, the second preview comprising a subset of the multiple graphical elements, the subset having less than all of the multiple graphical elements presented in the first preview, wherein each of the multiple graphical elements in the subset is presented to the user in the second preview based on device specific information, and wherein the second preview is displayed at a changed quality than the first preview, wherein the second preview is presented after the document data has been converted into printing instructions by the printer driver;
    enabling the user to change the setting associated with the subset of the multiple graphical elements to a new setting;
    converting the new setting into modified printing instructions, wherein the modified printing instructions comprise the same format as the printing instructions, wherein the modified printing instructions are provided to the printer driver; and using the modified printing instructions when printing the document.

2. The method of claim 1, further comprising applying a plurality of global settings to the printing instructions.

3. The method of claim 2, further comprising enabling the user to change the global settings.

4. The method of claim 1, further comprising performing page segmentation by the Render Independent elements or by the Device Dependent elements.

5. The method of claim 1, further comprising performing page segmentation by region.

6. The method of claim 1, further comprising performing page segmentation by object.

7. The method of claim 3, further comprising automatically highlighting individual graphical elements for the user that exceed a predefined threshold.

8. The method of claim 1, wherein the new setting is localized to the specific graphical element and does not apply to the entire document.

9. The method of claim 7, further comprising simulating a device specific rendering using the new setting, wherein inputs are displayed to the user as part of the second preview that enable the user to establish the new setting, wherein the inputs consist of inputs to change the half-tone of an image, inputs to change the resolution of the image, inputs to change the color tables of the image, inputs to change the color calibration of the image and inputs to remove red eye from the image.

10. The method of claim 9, further comprising providing the user with the option of saving the new setting.

11. The method of claim 1, further comprising enabling the user to select all the graphics in one or more pages from the first preview.

12. The method of claim 9, further comprising enabling the user to select a specific graphical element from the first preview and to apply a security setting for controlling access to the specific graphical element.

13. A computing device configured for modifying settings in printing a document, the computing device comprising:
a processor;
memory in electronic communication with the processor;
instructions stored in the memory, the instructions being executable by the processor to:
access document data that comprises multiple graphical elements;
convert the document data into printing instructions by a printer driver, wherein the printing instructions comprise Render Independent elements (Graphics Device Interface (GDI) instructions) or Device Dependent elements (DDI Instructions);
apply at least one setting to the printing instructions;
present a first preview of the printing instructions to a user through a graphical display, the first preview comprising the multiple graphical elements, wherein the first preview is presented after the document data has been converted into printing instructions by the printer driver;
present a second, different preview, the second preview comprising a subset of the multiple graphical elements, the subset having less than all of the multiple graphical elements presented in the first preview, wherein each of the multiple graphical elements in the subset is presented to the user in the second preview based on device specific information, and wherein the second preview is displayed at a changed quality than the first preview, wherein the second preview is presented after the document data has been converted into printing instructions by the printer driver;
enable the user to change the setting associated with the subset of the multiple graphical elements to a new setting;
convert the new setting into modified printing instructions, wherein the modified printing instructions comprise the same format as the printing instructions, wherein the modified printing instructions are provided to the printer driver; and
use the modified printing instructions when printing the document.

14. The computing device of claim 13, wherein the instructions are also executable to apply a plurality of global settings to the printing instructions.

15. The computing device of claim 14, wherein the instructions are also executable to enable the user to change the global settings.

16. The computing device of claim 13, wherein the instructions are also executable to perform page segmentation by the Render Independent elements or by the Device Dependent elements.

17. The computing device of claim 13, wherein the instructions are also executable to perform page segmentation by region.

18. The computing device of claim 13, wherein the instructions are also executable to perform page segmentation by object.

19. The computing device of claim 15, wherein the instructions are also executable to automatically highlight graphical elements for the user that exceed a predefined threshold.

20. The computing device of claim 13, wherein the new setting is localized to the specific graphical element and does not apply to the entire document.

21. The computing device of claim 19, wherein the instructions are also executable to simulate a device specific rendering using the new setting, wherein inputs are displayed to the user as part of the second preview that enable the user to establish the new setting, wherein the inputs comprise inputs to change the half-tone of an image, inputs to change the resolution of the image, inputs to change the color of the image, and inputs to remove red eye from the image.

22. The computing device of claim 21, wherein the instructions are also executable to provide the user with the option of saving the new setting.

23. The computing device of claim 13, wherein the instructions are also executable to enable the user to select all the graphics in one or more pages from the first preview.

24. The computing device of claim 21, wherein the instructions are also executable to enable the user to select a specific graphical element from the first preview and to apply a security setting for controlling access to the specific graphical element.

25. A computer-readable medium for storing program data, wherein the program data comprises executable instructions for:
accessing document data that comprises multiple graphical elements;
converting the document data into printing instructions by a printer driver, wherein the printing instructions comprise Render Independent elements (Graphics Device Interface (GDI) instructions) or Device Dependent elements (DDI Instructions);
applying at least one setting to the printing instructions;

presenting a first preview of the printing instructions to a user through a graphical display, the first preview comprising the multiple graphical elements, wherein the first preview is presented after the document data has been converted into printing instructions by the printer driver;

presenting a second, different preview, the second preview comprising a subset of the multiple graphical elements, the subset having less than all of the multiple graphical elements presented in the first preview, wherein each of the multiple graphical elements in the subset is presented to the user in the second preview based on device specific information, and wherein the second preview is displayed at a changed quality than the first preview, wherein the second preview is presented after the document data has been converted into printing instructions by the printer driver;

enabling the user to change the setting associated with the subset of the multiple graphical elements to a new setting;

converting the new setting into modified printing instructions, wherein the modified printing instructions comprise the same format as the printing instructions, wherein the modified printing instructions are provided to the printer driver; and using the modified printing instructions when printing the document.

26. The computer-readable medium of claim 25, wherein the program data further comprises executable instructions for applying a plurality of global settings to the printing instructions.

27. The computer-readable medium of claim 26, wherein the program data further comprises executable instructions for enabling the user to change the global settings.

28. The computer-readable medium of claim 25, wherein the program data further comprises executable instructions for performing page segmentation by the Render Independent elements or by the Device Dependent elements.

29. The computer-readable medium of claim 25, wherein the program data further comprises executable instructions for performing page segmentation by region.

30. The computer-readable medium of claim 25, wherein the program data further comprises executable instructions for performing page segmentation by object.

31. The computer-readable medium of claim 27, wherein the program data further comprises executable instructions for automatically highlighting graphical elements for the user that exceed a predefined threshold.

32. The computer-readable medium of claim 25, wherein the new setting is localized to the specific graphical element and does not apply to the entire document.

33. The computer-readable medium of claim 31, wherein the program data further comprises executable instructions for simulating a device specific rendering using the new setting, wherein inputs are displayed to the user as part of the second preview that enable the user to establish the new setting, wherein the inputs comprise inputs to change the half-tone of an image, inputs to change the resolution of the image, inputs to change the color of the image, and inputs to remove red eye from the image.

34. The computer-readable medium of claim 33, wherein the program data further comprises executable instructions for providing the user with the option of saving the new setting.

35. The computer-readable medium of claim 25, wherein the program data further comprises executable instructions for enabling the user to select all the graphics in one or more pages from the first preview.

36. The computer-readable medium of claim 33, wherein the program data further comprises executable instructions for enabling the user to select a specific graphical element from the first preview and to apply a security setting for controlling access to the specific graphical element.

37. The method of claim 10, wherein the second preview is presented by a viewer that (a) receives a viewer renderer format generated by a viewer driver, (b) receives the change of the setting, and (c) provides a modified viewer renderer format with the new setting.

38. The method of claim 37, wherein a converter performs the converting of the new setting into the modified printing instructions using the modified viewer renderer format from the viewer.

39. The method of claim 38, wherein the first and second previews are displayed as a thumbnail image.

40. The method of claim 39, wherein the second preview comprises an individual bitmap.

* * * * *